Patented Apr. 11, 1939

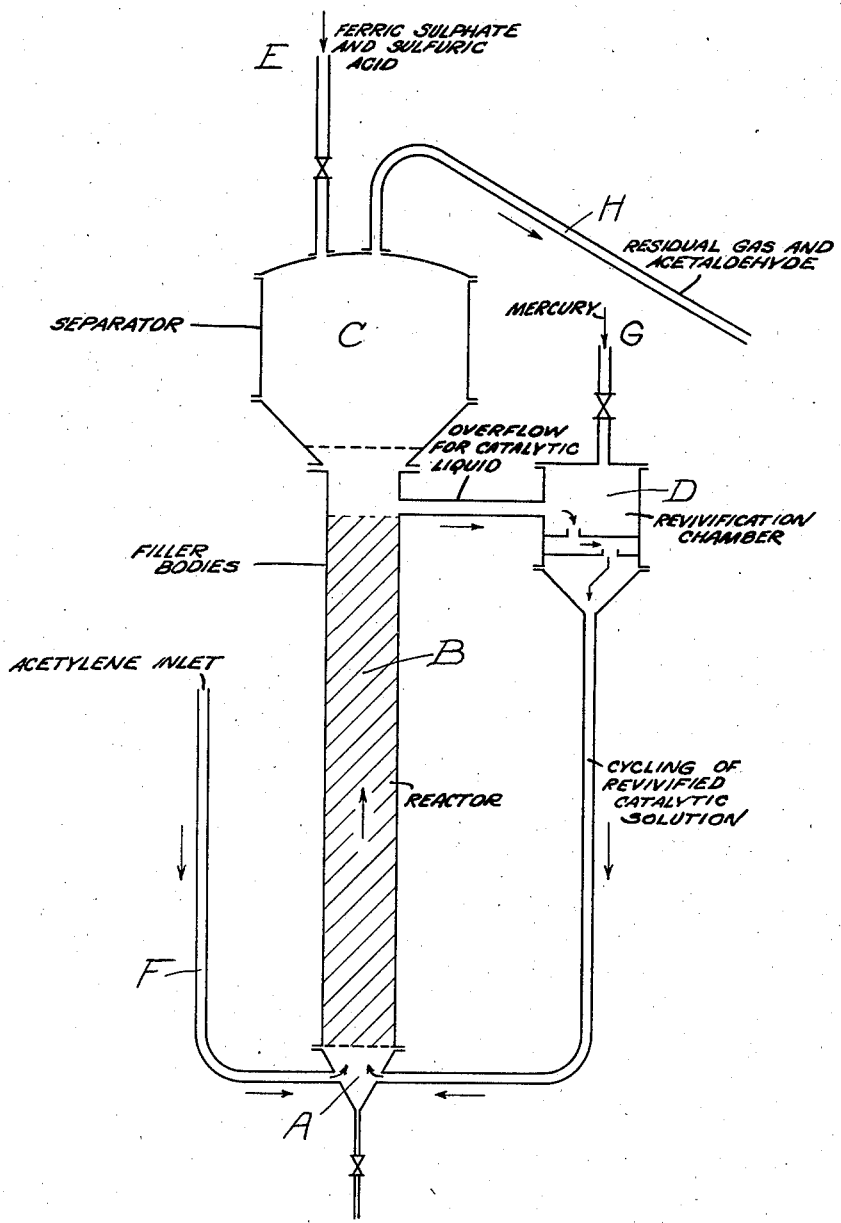

2,153,578

UNITED STATES PATENT OFFICE 2,153,578

PRODUCTION OF ACETALDEHYDE FROM GASES CONTAINING ACETYLENE

Friedrich Lieseberg, Ludwigshafen-on-the-Rhine, Germany, assignor to I. G. Farbenindustrie Aktiengesellschaft, Frankfort - on - the - Main, Germany Application June 2, 1936, Serial No. 83,069 In Germany June 12, 1935

2 Claims. (Cl. 260—605)

The present invention relates to the manufacture of acetaldehyde from gases containing acetylene.

It has already been proposed to prepare acetaldehyde from high percentage acetylene at ordinary or increased pressure by the addition of water with the aid of a catalytic liquid containing mercury sulphate which contains in addition to water an organic solvent for acetylene. The catalytic liquid may be led in circulation with the aid of a pump in order to keep the temperature of the catalytic liquid at the desired level by cooling or heating or in order to regulate the composition of the liquid. Since practically 100 per cent acetylene is employed, the acetylene may be led in circulation and there is no need to take care that as complete a conversion as possible into acetaldehyde is effected by a single passage through the catalytic liquid. It is more difficult, however, to work up gases containing acetylene such as are obtained for example in the electric arc under conditions which are favorable industrially and economically and which contain up to about 18 to 20 per cent of acetylene. These gases cannot be worked up into acetaldehyde in a cycle because the admixed inert gases which consist mainly of hydrogen become enriched and the partial pressure of acetylene in the circulating gas becomes more and more reduced. It is therefore necessary continuously to withdraw a large proportion of the gas from circulation and the acetylene contained therein is thus lost for the conversion into acetaldehyde. Since working in such a manner is uneconomical and industrially valueless, it is necessary to convert the gas mixture containing acetylene as completely as possible into acetaldehyde by a single passage of the gas through the catalytic liquid. It is only in this way that gases containing only a small percentage of acetylene can be worked up in an advantageous manner economically without waste of acetylene, the latter being of decisive importance as regards the possibility of using the process industrially.

In order to obtain this result it has already been proposed to convert the acetylene present in gas mixtures containing acetylene into acetaldehyde in counter-current in towers provided with filler bodies by means of suitable catalytic liquids which for example may contain iron salts in addition to mercury salts in sulphuric acid solution. The catalytic liquid must be withdrawn at the lower end of the reaction tower by means of a pump insensitive to hot sulphuric acid and forced into the top of the tower in counter-current to the ascending current of gas. Such a method of working necessitates special expensive materials for the pumps and also a continuous expenditure of power for leading the catalytic liquid in circulation. The technical drawbacks which arise in the circulation of hot sulphuric acid by means of a pump are thus increased by the cost of the expenditure of power. Furthermore, when working in counter-current, the reaction tower cannot be loaded beyond a certain limit because otherwise the catalytic liquid flowing in counter-current to the current of gas becomes dammed up and the washing action of the liquid distributed in the tower and consequently also the desired reaction suffers. Thus the maximum throughput for a given tower space which would otherwise be permitted by the reactivity of the catalytic liquid cannot be attained but the damming action places a limit on the result aimed at. It is therefore necessary to construct larger or more numerous towers for working up a given amount of acetylene. This means a considerable injurious effect on the possibility of employing gases containing acetylene derived from electric arc treatments instead of high percentage acetylene for working up into acetaldehyde.

I have now found that the acetylene in gases containing acetylene such as are obtained by thermal methods, in particular in the electric arc, can be advantageously converted into acetaldehyde by leading the gas to be treated in the same direction as the catalytic liquid and leading the latter in a cycle at the same time. The circulation of the catalytic liquid is preferably carried out so that a multiple of the amount of liquid present in the reaction vessel is circulated per hour. This can be effected in a particularly favorable manner when an apparatus is used such as is shown diagrammatically in the accompanying drawing; the invention is not, however, restricted to the use of the particular example of apparatus shown.

Referring to the drawing, the gas mixture containing acetylene flows into the lower part of the tower at A. The catalytic liquid which is present therein as well as in the central part of the tower B (which may be filled with filler bodies) is carried up by the current of gas in the form of a foam and collects in the upper part of the tower C, from which it flows back to the lower part A again through an overflow pipe. The rapidity of the circulation movement of the catalytic liquid thus depends merely on the smaller specific gravity by reason of the partial formation of foam in the tower and on the amount of gas mixture containing acetylene introduced into the tower. A pump is therefore unnecessary and all the difficulties encountered in pumping hot acids are thus obviated. Similarly a continuous expenditure of power for pumping is also unnecessary. A damming up of the catalytic liquid in the tower can never occur because the gas and the catalytic liquid flow in the same direction.

In order to work up acetylene in gases containing acetylene into acetaldehyde, the procedure may be as follows: A solution containing free sulphuric acid and ferric sulphate is charged in an amount adapted to the size of the reaction tower into the tower at E. By blowing in steam or by indirect heating of the tower, the solution is heated to about 90° C. Mercury is charged into the portion D of the tower after the said temperature has been reached and then the gas mixture containing acetylene is blown through the tube F. The catalytic solution is carried up to C, flows into D, becomes saturated with mercury compounds and flows back to A in a cycle. The mercury compounds which have been carried along are partly used up in the tower; the solution flows again into D, is again saturated with mercury compounds and the cycle commences again. By this arrangement the amount of mercury necessary for the addition of water to the acetylene is always available. The residual gas together with the aldehyde formed flows through the part C of the tower and leaves through the pipe H after which it is freed from aldehyde in an attached condenser and washing tower (not shown). In this manner it is possible to obtain high throughputs and to adapt the necessary amount of catalytic liquid to the gas throughput of the tower because the amount of liquid circulated per hour is always dependent on the gas throughput. With the high throughputs obtained, a practically complete conversion of the acetylene into acetaldehyde is obtained. In the known counter-current processes, it was only possible to work up a gas mixture containing 3 per cent of acetylene. According to this invention, on the contrary, gases which contain up to about 18 to 20 per cent of acetylene may be converted.

The mercury compounds necessary for and partly used up by the reaction must be freshly formed again by the reaction of metallic mercury with ferric salts. The ferrous salts thus formed must be oxidized again. The regeneration of the catalytic solution may be interposed in the cycle or carried out separately therefrom. The throughputs may be increased even more by carrying out the reaction under increased pressure.

The following example will further illustrate the nature of this invention, but the invention is not restricted to this example.

Example

A catalytic solution containing 50 grams of free sulphuric acid and 35 grams of iron in the form of ferrous and ferric sulphate per litre is introduced into a tower such as is shown in the drawing. The catalytic solution is circulated and brought into contact with metallic mercury at a suitable place. The solution is thus saturated with mercury compounds of the mercurous and mercuric stages by the reaction of the metallic mercury with the ferric sulphate. A gas mixture containing 18 per cent by volume of acetylene is blown into the said catalytic solution with the addition of an amount of steam which corresponds to the amount of water necessary for the addition of water to the acetylene and for the maintenance of the concentration of the catalytic solution. The waste gas in the part C of the tower is under an excess pressure of 0.5 atmosphere. The gas and the catalytic liquid flow in the same direction. The gas mixture containing acetylene is converted by a single passage through the catalytic solution to the extent of 97.8 per cent so that in the waste gas there can only be detected 0.4 per cent by volume of acetylene in addition to acetaldehyde and accompanying gases. 94 per cent of the amount of actylene introduced are converted into acetaldehyde, about 2 per cent into crotonaldehyde and another 1.8 per cent into acetic acid.

What I claim is:

1. In the production of acetaldehyde from gases containing up to about 20 per cent of acetylene by means of an acid solution containing mercury compounds the step which comprises leading the gas to be treated through the reaction vessel in the same direction as the catalytic liquid, withdrawing the latter from the upper part of the reaction vessel, saturating it with mercury compounds and returning it to the lower part of the reaction vessel.

2. In the process according to claim 1 the step which comprises circulating the catalytic liquid so that a multiple of the amount of liquid present in the reaction vessel is circulated per hour.

FRIEDRICH LIESEBERG.